(12) United States Patent
Sultana et al.

(10) Patent No.: US 12,595,172 B1
(45) Date of Patent: Apr. 7, 2026

(54) DOWNSTREAM CATALYTIC STABILIZATION AND SELECTIVE RECYCLE SYSTEM FOR PLASMA REACTOR EFFLUENTS

(71) Applicant: Cameron International Corporation, Houston, TX (US)

(72) Inventors: Ruhi Sultana, Cambridge, MA (US); Gary W. Sams, Houston, TX (US); Shawn Taylor, Cambridge, MA (US); Julia Forsythe, Cambridge, MA (US)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 19/317,746

(22) Filed: Sep. 3, 2025

(51) Int. Cl.
*C01B 3/26* (2006.01)

(52) U.S. Cl.
CPC ............ *C01B 3/26* (2013.01); *C01B 2203/04* (2013.01); *C01B 2203/062* (2013.01); *C01B 2203/1241* (2013.01); *C01B 2203/1676* (2013.01); *C01B 2203/168* (2013.01)

(58) Field of Classification Search
CPC .............................. C01B 3/26; C01B 2203/04
See application file for complete search history.

(56) References Cited

U.S. PATENT DOCUMENTS

| | | | |
|---|---|---|---|
| 6,179,996 B1 * | 1/2001 | Baker | C10G 49/22 585/818 |
| 2022/0070993 A1 * | 3/2022 | Ha | B01J 23/8913 |
| 2022/0289645 A1 * | 9/2022 | Tinger | B01J 29/70 |

* cited by examiner

*Primary Examiner* — Paul A Wartalowicz
(74) *Attorney, Agent, or Firm* — Kyle R. Miiller

(57) ABSTRACT

Systems and methods to integrate product stabilization directly into the plasma conversion system are provided herein. The system includes a catalyst bed located downstream of the plasma reactor. The plasma reactor produces saturated and unsaturated hydrocarbons and hydrogen. The plasma effluent flows directly into a catalyst bed containing catalyst, which helps to provide process stability for species in the plasma effluent while they retain plasma-induced activation. The hydrogenation efficiency is controlled mostly by the catalyst bed temperature and space velocity. The stabilized product is sent to a separator unit where the liquid and gas products are separated for further processing.

15 Claims, 3 Drawing Sheets

300

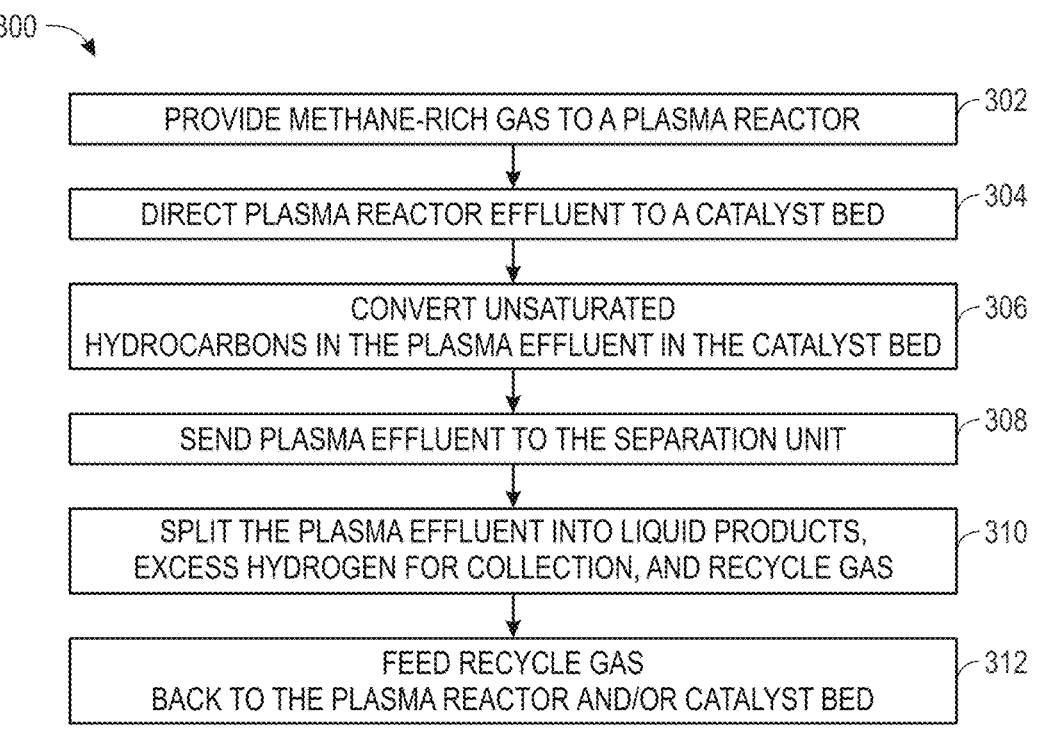

| | |
|---|---|
| PROVIDE METHANE-RICH GAS TO A PLASMA REACTOR | 302 |
| DIRECT PLASMA REACTOR EFFLUENT TO A CATALYST BED | 304 |
| CONVERT UNSATURATED HYDROCARBONS IN THE PLASMA EFFLUENT IN THE CATALYST BED | 306 |
| SEND PLASMA EFFLUENT TO THE SEPARATION UNIT | 308 |
| SPLIT THE PLASMA EFFLUENT INTO LIQUID PRODUCTS, EXCESS HYDROGEN FOR COLLECTION, AND RECYCLE GAS | 310 |
| FEED RECYCLE GAS BACK TO THE PLASMA REACTOR AND/OR CATALYST BED | 312 |

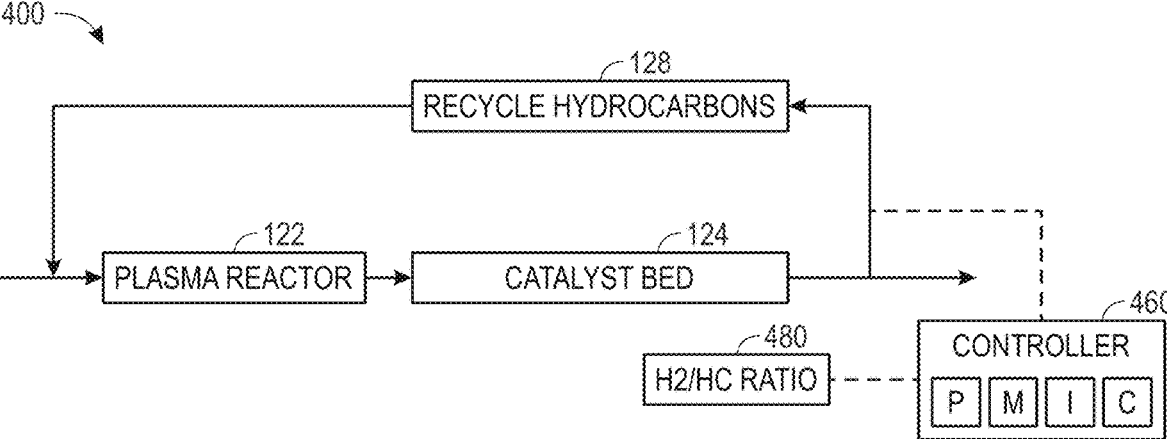

*FIG. 4*

DOWNSTREAM CATALYTIC STABILIZATION AND SELECTIVE RECYCLE SYSTEM FOR PLASMA REACTOR EFFLUENTS

BACKGROUND

The present disclosure generally relates to plasma reactors, and more particularly to hydrogenate unsaturated hydrocarbons output by low energy plasma reactors, such as non-thermal plasma reactors (e.g., Dielectric Barrier Discharge (DBD) plasma reactors and other plasma reactors capable of methane to high hydrocarbon conversion).

The plasma conversion of methane produces a complex mixture of saturated and unsaturated hydrocarbons (with double/triple bonds) along with significant hydrogen production (e.g., 10% or less of the total products, by mass or volume). While these compounds represent successful C—C coupling, their process instability makes them challenging to transport and store. Additionally, the substantial hydrogen production may result in operational inefficiencies. Current solutions either ignore product process stability or employ separate, energy-intensive hydrogenation units that do not take advantage of the process-generated hydrogen.

Generally, plasma conversion and hydrogenation are treated as separate processes. Hydrogenation reactions add hydrogen atoms to a molecule and hydrogenate the unsaturated hydrocarbons in the plasma effluent. However, separate processes increase energy consumption and impact operation efficiency and product quality. The integration of product process stabilization into the plasma conversion system would address reactive species, from a process stability perspective, from the plasma effluent. In addition, a selective recycle system would optimize the feed composition without external hydrogen requirements. The integration of the catalyst bed between the plasma reactor and the separation unit would simplify operations, reduce energy consumption compared to the separate systems, and achieve greater product saturation under moderate conditions.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system may include a plasma reactor configured to receive a feed gas flow at an inlet of the plasma reactor and to produce a mixture of saturated and unsaturated hydrocarbons and hydrogen. The system may include a catalyst bed disposed downstream of the plasma reactor, wherein the catalyst bed is configured to hydrogenate the unsaturated hydrocarbons output by the plasma reactor and output a product flow. The system may also include a separator configured to receive the product flow output from the catalyst bed and separate the product flow into liquid products, excess hydrogen for collection, and recycle gas.

In one embodiment, a method may include hydrogenating unsaturated hydrocarbons by introducing effluent from a plasma reactor to a catalyst bed. The effluent includes the unsaturated hydrocarbons and saturated hydrocarbons, and the catalyst bed is configured to use hydrogenation catalysts to hydrogenate the unsaturated hydrocarbons and control the temperature of the catalyst bed to achieve high rates of hydrogenated hydrocarbon products. The method also includes providing a hydrogenated product flow from the catalyst bed to a separator unit.

In one embodiment, a controller is configured to determine a H2/HC ratio in a plasma reactor system, identify that the H2/HC ratio is outside of a target range, and control a recycle flow to adjust the H2/HC ratio into the target range.

The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 3 illustrates a flow chart for a process of the plasma reaction of FIG. 1, according to one or more embodiments of this disclosure;

FIG. 4 illustrates a schematic diagram of a hydrogen to hydrocarbon (H2/HC) ratio controller, according to one or more embodiments of this disclosure;

DETAILED DESCRIPTION

Figure 1:
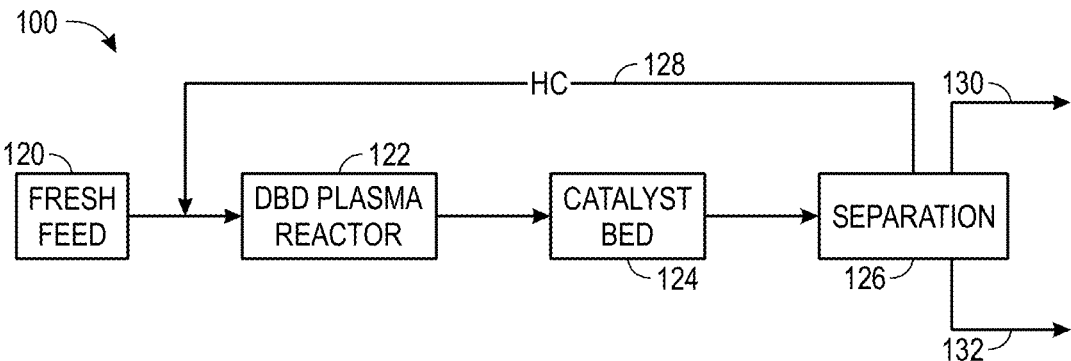
FIG. 1 illustrates a schematic diagram of a plasma reaction, according to one or more embodiments of this disclosure.

Certain embodiments commensurate in scope with the present disclosure are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

Furthermore, when introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment," "an embodiment," or "some embodiments" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

As used herein, the term "coupled" or "coupled to" may indicate establishing either a direct or indirect connection (e.g., where the connection may not include or include intermediate or intervening components between those coupled), and is not limited to either unless expressly referenced as such. The term "set" may refer to one or more items. Wherever possible, like or identical reference numerals are used in the figures to identify common or the same elements. The figures are not necessarily to scale and certain features and certain views of the figures may be shown exaggerated in scale for purposes of clarification.

As used herein, the terms "inner" and "outer"; "up" and "down"; "upper" and "lower"; "upward" and "downward"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The plasma conversion of methane produces a mixture of saturated and unsaturated hydrocarbons (with double/triple bonds) along with significant hydrogen production. A system processes methane-rich feed gas through a plasma reactor, producing saturated hydrocarbons, unsaturated hydrocarbons (15-20% of output) and hydrogen (20-25%). The process instability of the unsaturated hydrocarbons makes the product challenging to transport and store. In addition, the substantial hydrogen production results in operational inefficiencies. The current systems either ignore product process stabilization or employ separate, energy-intensive hydrogenation units that fail to utilize the process-generated hydrogen.

To address these challenges and operate more efficiently, the present disclosure describes the plasma effluent flowing directly into a catalyst bed containing catalyst, which helps to provide process stability in the effluent while retaining plasma-induced activation. In some embodiments, the catalyst bed temperature and space velocity control the extent of hydrogenation by determining the reaction rate and the time duration of the interaction between the reactants with the catalyst. An efficient mass transfer may also allow the reactants to interact with the active sites on the catalyst and that the products can be removed without preventing the reaction.

After unsaturated hydrocarbons have been hydrogenated, a gas separation system splits the output into three streams: liquid product, excess hydrogen for collection, and recycle gas. The disclosed techniques include a selective recycle system that returns excess hydrogen and unconverted hydrocarbons to the plasma reactor inlet at controlled ratios, improving both plasma conversion and hydrogenation efficiency.

The recycle gas stream composition is controlled to maintain specified H2/HC ratios, enhancing both plasma conversion and hydrogenation efficiency while minimizing energy requirements. This integrated approach achieves high-quality liquid products with process stability through a simplified process configuration. This configuration achieves product process stabilization and enhanced conversion while minimizing energy consumption and system complexity.

With this in mind, FIG. 1 illustrates a schematic diagram 100 of a plasma reaction system, according to one or more embodiments of this disclosure. The schematic diagram 100 includes a fresh feed 120, a plasma reactor 122, a catalyst bed 124, a separation unit 126, a hydrocarbon recycle gas 128, and an outlet stream 130 from the separation unit.

In one nonlimiting example, the fresh feed 120 includes methane-rich gas or a mixture of gases that is sent to the plasma reactor 122 to undergo plasma reactions. In some embodiments, the gases may include noble gases (e.g. Argon and helium), mixtures of gases (e.g. carbon dioxide (CO2) with nitrogen (N2) or methane (CH4)), and/or specific gases (e.g. oxygen for ozone generation, hydrogen for reactions involving hydrogen, or methane for methane conversion reactions).

In the illustrated embodiment, the plasma reactor 122 receives the fresh feed 120 into the inlet of the plasma reactor 122. The plasma reactor may be a low energy, non-thermal, plasma reactor, such as a Dielectric Barrier Discharge (DBD) plasma reactor, or other plasma reactor capable of converting methane into hydrocarbons. The fresh feed 120 may be combined with the recycle gas 128 and provided to the plasma reactor 122. The gas flow is subjected to dielectric barrier discharge in the plasma reactor 122, which converts the gas flow into a process fluid (e.g., process liquid, process gas, process liquid-gas mixture, etc.). The plasma reactor 122 converts the methane-rich gas or other gas mixtures from the fresh feed 120 with the recycle gas 128 to produce a complex mixture of saturated and unsaturated hydrocarbons (C2-C6 with double/triple bonds) with significant hydrogen production.

As previously described, in some embodiments, the plasma reactor 122 may be a DBD plasma reactor that relies on dielectric barrier discharge, which is an electrical discharge between two electrodes separated by a dielectric barrier (e.g., insulating dielectric barrier, insulator, etc.). In certain embodiments, the dielectric barrier includes glass, alumina, polymer films, and the like. The electrical discharge is created by applying a voltage (e.g., AC voltage) to one or both electrodes. When a gas (e.g., anhydrous ammonia, hydrogen sulfide, carbon dioxide, etc.) is present between the two electrodes, the dielectric barrier discharge may be used for generating plasma. Dielectric barrier discharge is used in ozone generation, plasma displays, excimer lamps, and decomposing harmful exhaust gases.

The reactor plasma effluent flows from an outlet of the reactor to a catalyst bed 124 containing catalyst. The species produced by the plasma reactor interact with the catalyst bed 124. The metal catalysts may include noble metals, such as platinum, palladium, cerium, and/or rhodium on stainless steel support for the hydrogenation reactions. Additionally, catalysts such as iridium, nickel, and/or ruthenium can be utilized in hydrogenation reactions to react hydrogen with the other compounds. Cobalt-molybdenum (CoMo) or nickel-molybdenum (NiMo) catalysts supported on γ-alumina may also be used for hydrodesulfurization reactions. Catalysts such as biomimetic catalysts can also increase selectivity in olefin saturation. In other embodiments, the catalyst may include cobalt, aluminum oxide, titanium dioxide, silicon dioxide, zirconium oxide, yttrium oxide, a combination of lanthanum and zirconium oxide, ceric oxide, iron, molybdenum incorporated into zeolites (e.g., ZSM-5, ZSM-11, ZSM-22, ZSM-23), mordenite, or any combination thereof. The catalyst provides surface sites for the gases in the plasma reactor effluent to adsorb and react. The catalyst in the catalyst bed 124 helps to hydrogenate unsaturated hydrocarbons to provide process stability while the plasma reactor effluent retains plasma-induced activation.

In some embodiments, the system employs metal catalysts operating at specific temperatures (e.g., 100-500° C.). The catalyst bed 124 temperature and space velocity control the extent of hydrogenation. The catalyst bed temperature ranges may vary depending on the operating conditions. For example, the operating temperature ranges can range from 100° C. to 500° C. depending on the catalyst activity, plasma conditions, and life cycle.

The catalyst bed 124 may also be in a lead/lag catalyst bed configuration where two or more catalyst beds 124 are arranged in series, with one catalyst bed 124 acting as the working catalyst bed and the other(s) as a backup bed. The working catalyst bed (lead bed) 124 performs the majority of the catalytic reaction, while the back-up bed avoids exhausting the lead bed.

The plasma effluent is then sent to the separation unit 126. The separation unit 126 splits the plasma effluent. In some embodiments, the separation unit 126 may include a single unit or multiple units configured to separate hydrogen, hydrocarbon gases, hydrocarbon liquids, and so forth. The outlet stream 130 includes liquid products 132, excess hydrogen for collection, and the recycle gas 128. The recycle gas 128 includes unconverted hydrocarbons that are mixed with the fresh feed 120, and provided to the input of the plasma reactor 122. The liquid products 132 are sent to the downstream units for further processing.

The removal of the components for further processing such as unsaturated hydrocarbons (e.g. olefins, dienes, etc.) provides process stability to the hydrocarbons, thus reducing or preventing operating issues downstream. For example, unsaturated hydrocarbons in crude oil can cause oxidation, polymerization, waxing, and gum formation while in storage and can experience process instability under high temperatures. The unsaturated hydrocarbons may also cause coke formation on catalysts and decrease catalyst activity and cycle length for downstream processing units.

In some embodiments, the separation unit 126 may be a knockout drum, or a low-pressure vessel and operate at the low-pressure conditions typical of plasma reactor system. The knockout drums may be horizontal or vertical vessels based on space requirements. The knockout drum may separate liquids and entrained particles from the gas or vapor stream and decrease the velocity of the gas stream. The knockout drum settles out the liquids or condensates and stops the liquids from carrying over into the gas stream. In some embodiments, the gas flow and/or the liquid products may include heavier hydrocarbons (e.g., butane, pentane, hexane, heptane, octane, nonane, decane, etc.).

In some embodiments, the separation unit 126 may utilize one or more separation methods such as condensation (e.g., cooling followed by flash separation or distillation), as well as additional purification techniques such as cryogenic distillation. The separation unit 126 may cool and condense the condensable hydrocarbons at lower temperatures. Cryogenic distillation may separate gases by their boiling points at very low temperatures using liquid nitrogen or other cryogenic fluids.

In some embodiments, the excess hydrogen for collection can be sent to a hydrogen recovery system. For example, the hydrogen recovery unit may include a Pressure Swing Adsorption (PSA) and membrane separation for effective hydrogen recovery. PSA eliminates impurities from the hydrogen-rich gas streams. The membrane separation system purifies the hydrogen.

Figure 2:
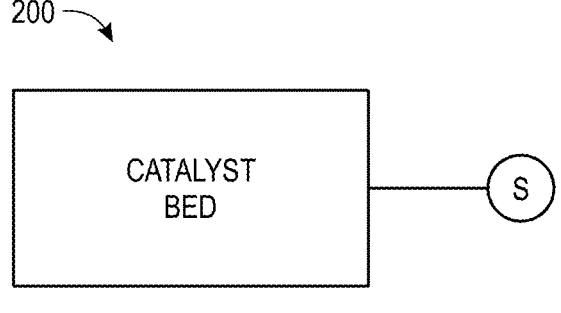
FIG. 2 illustrates a schematic diagram of a catalyst bed of the plasma reaction of FIG. 1, according to one or more embodiments of this disclosure.

FIG. 2 illustrates a schematic diagram 200 of the catalyst bed 124, according to one or more embodiments of this disclosure.

The reactor plasma effluent flows to the catalyst bed 124. In some embodiments, the catalyst bed 124 is a fixed bed containing hydrogenation catalysts. The hydrogenation beds can include fixed-bed reactors, trickle-bed reactors, and/or packed-bed reactors.

In some embodiments, trickle-bed reactors may be used for catalytic hydrogenation reactions. In some embodiments, a guard bed may also be located prior to the main catalyst bed to filter particulates and prevent any differential pressure from increasing. The gas and/or liquid may flow together downward through the trickle-bed reactor.

In some embodiments, the catalyst bed 124 contains metal catalysts and operates at specific temperatures (100° C. to 500° C.). In some embodiments, the catalyst bed 124 may include one or more sensors to monitor one or more operating variables (e.g. flow, pressure, temperature, etc.). The catalyst bed 124 temperature and space velocity may be used to control the extent of hydrogenation. The space velocity is a calculation of the gas flow rate through the catalyst bed based on the volume of the catalyst. The space velocity is calculated by dividing the volumetric gas flow into the catalyst bed 124 by the volume of the catalyst bed 124. Space velocity may be used to control the rate of reaction and indicate the contact time between the gas and the catalyst.

For example, the Gas Hourly Space Velocity (GHSV) is a calculation of the volumetric flow rate of gas per unit volume of catalyst bed 124 or volume of the catalyst. The units typically used are 1/hour (or $h^{-1}$). The GHSV indicates the quantity of gas processed through the reactor or catalyst per hour at standard temperature and pressure (STP) in relation to the reactor's volume. The residence time is the average time a molecule of gas occupies within the catalyst bed 124 and is inversely proportional to the GHSV. Thus, a higher GHSV results in a shorter residence time. An example of a residence time in the catalyst bed would be 2-3 sec.

GHSV can affect the reaction rate and conversion. A higher GHSV results in more gas flowing through the catalyst bed 124 per unit time, resulting in a faster reaction rate, higher conversion, and impact on the quality and selectivity of products. However, a high reaction rate will be effective only up to an efficient value. If the space velocity exceeds the efficient value, the reactants might not have sufficient time to contact the catalyst surface and undergo complete reactions.

Mass transfer relates to the passage of reactants and products between the bulk fluid and the catalyst surface. Inefficient mass transfer can also decrease the reaction rate and prevent hydrogenation reactions from occurring. A high mass transfer rate can result in a lower reaction rate and affect the hydrogenation reactions by limiting the contact time between the reactants and the catalyst active sites. A high mass transfer rate can also cause the products to block the catalyst active sites from being contacted by the reactants.

The sensors can be used to monitor the differential pressure of the catalyst bed 124. A high-pressure differential (DP) in the catalyst bed 124 can be an indication of multiple issues, including incipient carbon laydown, solid precipitation, or fouling. The potential causes of a high pressure drop include colloidal clays, iron sulfide, or other fines accumulating in the catalyst bed 124. The troubleshooting strategies for these issues can include a combination of operational changes, catalyst management, and chemical treatments.

The poisons to the catalyst include sulfur compounds (like H2S and CS2), metallic impurities (like lead and arsenic), and some organic molecules. The catalyst poisons may deactivate the active catalyst sites. Contamination of the water in the catalyst beds 124 may also decrease performance and catalyst cycle length, resulting in catalyst deactivation and lower efficiency. Water can poison catalysts and decrease the catalytic reaction by physically blocking active sites. Water in the catalyst bed 124 can be mitigated by purifying feedstocks, monitoring moisture levels, and using proper catalyst regeneration techniques.

FIG. 3 illustrates a flow chart 300, according to one or more embodiments of this disclosure.

In Block 302, methane-rich gas is provided to a plasma reactor. Fresh feed 120 including methane-rich gas or a mixture of gases along with the recycled hydrocarbon gas is provided to the plasma reactor 122 to undergo plasma reactions.

In Block 304, plasma reactor effluent is directed to the catalyst bed. The system employs metal catalysts operating at moderate temperatures (100-500° C.). The plasma effluent includes species from the plasma with possible process instability.

In Block 306, unsaturated hydrocarbons in the plasma effluent are converted in the catalyst bed. The catalyst bed placement takes advantage of species from the plasma, while the selective recycle system optimizes feed composition without external hydrogen requirements.

In Block 308, the plasma effluent is sent to the separation unit. The separation unit, which is downstream of the catalyst bed, separates different components of the plasma effluent gas stream. The specific separation unit depends on the type of plasma reactor and the intended products.

In Block 310, the separation unit splits the plasma effluent into liquid products, excess hydrogen for collection, and recycle gas, which may include hydrogen and hydrocarbons. The recycle gas is directed back to the fresh feed, mixed with the fresh feed and provided to the plasma reactor. The liquid products may be sent to the downstream units for further processing.

In Block 312, recycled hydrogen is fed back to the catalyst bed and the recycled hydrocarbons are fed back to the plasma reactor along with the fresh feed. The recycle stream composition is controlled to maintain specified H2/HC ratios, enhancing both plasma conversion and hydrogenation efficiency while minimizing energy requirements. In one embodiment, optimal H2/HC ratios of 1/2 to 1/3 for both plasma reactions and subsequent hydrogenation will be maintained.

FIG. 4 is a schematic diagram 400 of a hydrogen to hydrocarbon ratio (H2/HC) ratio controller 460, according to one or more embodiments of this disclosure. The H2/HC ratio 480 is a measure of the hydrogen to hydrocarbon flow to the catalyst bed 124. The H2/HC ratio controller 460 affects catalyst process stability by controlling the H2/HC ratio 480. The H2/HC ratio 480 is calculated as the moles of hydrogen per mole of hydrocarbon feed entering the reactor. In one nonlimiting embodiment, the controller 460, which may be a PID controller, controls the H2/HC ratio 480 to match or be within a specific range of a target H2/HC ratio 480 by adjusting flow of the recycle gas 128.

A higher H2/HC ratio 480 has a higher efficiency in removing sulfur and nitrogen compounds from hydrocarbon feedstocks and increases hydrogenation efficiency. The H2/HC ratio 480 affects catalyst activity and coke formation. The H2/HC ratio 480 calculates the moles of hydrogen per mole of hydrocarbon feed flow to the reactor 122. The H2/HC ratio 480 is affected by the hydrogen purity, feed flow rate, and recycle gas flow rate. The target H2/HC ratio 480 is set to provide process stability to the catalyst. A hydrogen to hydrocarbon ratio that is above the target H2/HC ratio 480 can result in catalyst deactivation and coke formation, while an H2/HC ratio 480 below target can lead to incomplete reactions and a reduced product quality.

Figure 5:
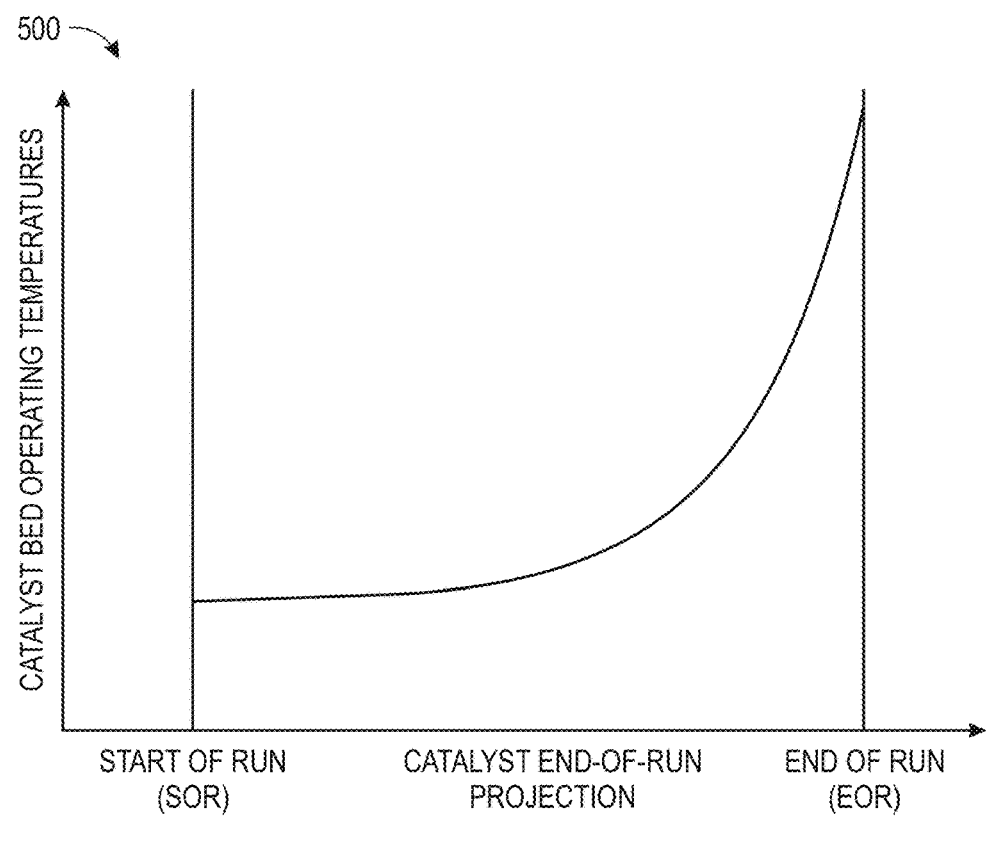
FIG. 5 illustrates a graph depicting the start of run and end of run catalyst projections of the plasma reaction of FIG. 1, according to one or more embodiments of this disclosure.

FIG. 5 is a catalyst bed operating temperature and the catalyst projection graph 500. As the catalyst reaches the end of the run, the operating temperatures to achieve the same conversion increases.

In addition, the catalyst bed 124 operates below the maximum operating temperatures. For example, if the catalyst bed 124 operates at maximum operating temperatures, thermal degradation of the catalyst can occur due to a higher rate of reaction. The catalyst activity will decrease, and the catalyst will have a shorter life cycle. The operation of the catalyst bed 124 at higher than the maximum operating temperatures can result in undesired side reactions (e.g. gas cracking and gas yield) and result in catalyst deactivation and coke formation. The high temperatures can also result in splitting $CO_2$ into the gas phase and impact the energy efficiency.

If the catalyst bed is operating below the minimum temperature, decreased reaction rates and incomplete reactions may occur. If the catalyst bed is operated below the minimum temperature, the efficiency of the catalyst and overall process will be decreased.

Figure 6:
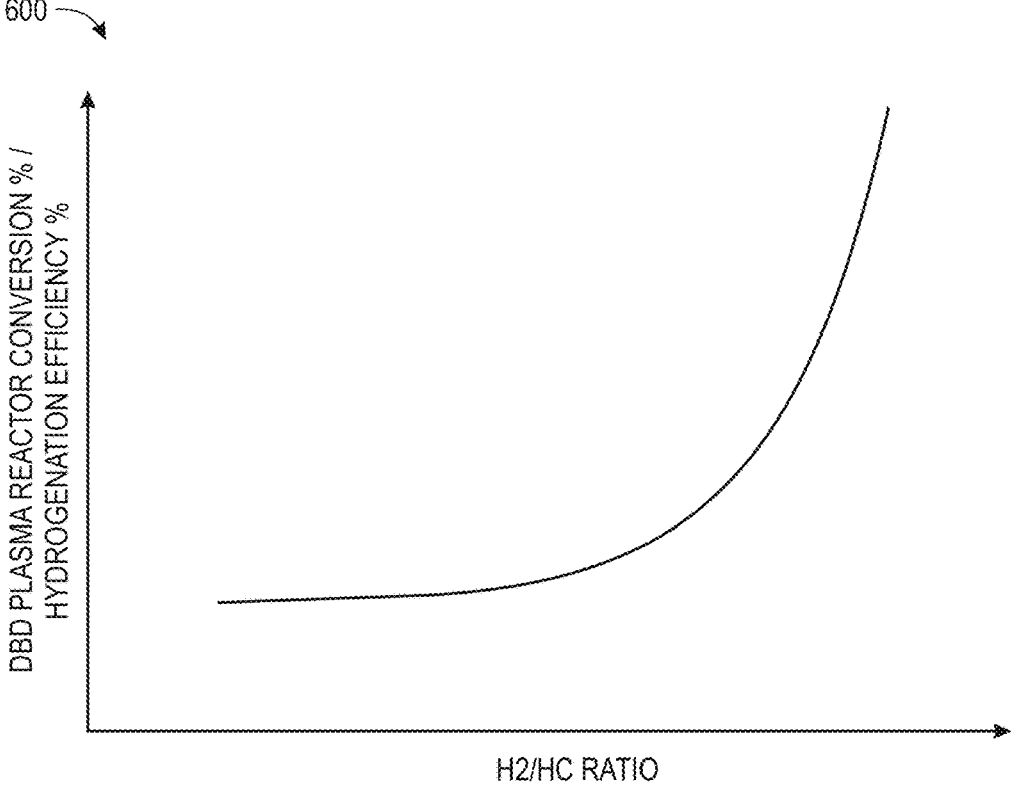
FIG. 6 illustrates a graph depicting the reactor conversion and H2/HC ratio of the plasma reaction of FIG. 1, according to one or more embodiments of this disclosure.

FIG. 6 is a graph 600 depicting the reactor conversion, hydrogenation efficiency, and H2/HC ratio. The hydrogenation efficiency is defined as the ratio of hydrogen consumed to the hydrocarbon converted. The hydrogen/hydrocarbon (H2/HC) ratio is determined by calculating the moles of recycle hydrogen per mole of feed gas charged to the unit. The H2/HC ratio is used to control the reaction conditions, such as the catalyst lifecycle, product quality, and the efficiency of the overall process. A higher H2/HC ratio results in a higher hydrogenation efficiency and plasma reactor conversion.

The technical effect of the disclosed embodiments includes providing process stability for plasma effluent, reducing energy consumption compared to separate systems, and achieving greater product saturation under moderate conditions.

The subject matter described in detail above may be defined by one or more clauses, as set forth below.

In certain embodiments, a system, includes a plasma reactor configured to receive a feed gas flow at an inlet of the 0 plasma reactor and to produce a mixture of saturated and unsaturated hydrocarbons and hydrogen; a catalyst bed disposed downstream of the plasma reactor, wherein the catalyst bed is configured to hydrogenate the unsaturated hydrocarbons output by the plasma reactor and output a product flow; and a separator configured to receive the product flow output from the catalyst bed and separate the product flow into liquid products, excess hydrogen for collection, and recycle gas.

The system of the preceding embodiment, wherein a recycle system is configured to control a composition of the feed to the inlet of the plasma reactor by providing the recycle gas without external hydrogen being added to the recycle gas.

The system of any of the preceding embodiments, wherein the recycle system is configured to control a flow of the recycle gas to the inlet of the plasma reactor.

The system of any of the preceding embodiments, wherein the system is configured to control the hydrogenation of the unsaturated hydrocarbons by controlling a temperature of the catalyst bed, a space velocity of the catalyst bed, or both.

The system of any of the preceding embodiments, wherein the catalyst bed is in a lead/lag catalyst bed configuration comprising two or more catalyst beds arranged in series.

The system of any of the preceding embodiments, wherein the system is configured to control composition of the recycle gas based on a hydrogen to hydrocarbon ratio.

The system of any of the preceding embodiments, wherein the system is configured to identify carbon laydown, solid precipitation, fouling, or a combination thereof based on a pressure differential in the catalyst bed being above a threshold value.

The system of any of the preceding embodiments, wherein the system is configured to control the catalyst activity based on operating temperatures of the catalyst.

The system of any of the preceding embodiments, wherein the system is configured to determine a hydrogen to hydrocarbon (H2/HC) ratio based on a number of moles of hydrogen in the recycle gas per mole of feed gas flow.

The system of any of the preceding embodiments, wherein the catalyst bed is configured to provide process stability while retaining plasma-induced activation.

In certain embodiments, a method of hydrogenating unsaturated hydrocarbons, includes introducing effluent from a plasma reactor to a catalyst bed, wherein the effluent comprises the unsaturated hydrocarbons and saturated hydrocarbons, wherein the catalyst bed is configured to use a hydrogenation catalyst to hydrogenate the unsaturated hydrocarbons; controlling a temperature of the catalyst bed to achieve hydrogenation; and providing a hydrogenated product flow from the catalyst bed to a separator unit.

The method of the preceding embodiment, including determining a space velocity based on a volumetric gas flow into the catalyst bed and a volume of the catalyst bed.

The method of the preceding embodiment, wherein the catalyst bed is configured to provide process stability while retaining plasma-induced activation.

The method of the preceding embodiment, wherein the separator unit is configured to separate the effluent into liquid products, excess hydrogen for collection, and recycle gas.

The method of the preceding embodiment including controlling a reaction operating temperature to control catalyst activity.

The method of the preceding embodiment including determining the hydrogen to hydrocarbon (H2/HC) ratio based on moles of recycle hydrogen per mole of feed gas provided to the plasma reactor.

In certain embodiments, a system, includes a controller configured to: determine a H2/HC ratio; identify that a H2/HC ratio is outside of a target range; and control the recycle flow to adjust the H2/HC ratio into the target range.

The system of the preceding embodiment includes hydrogen and unconverted hydrocarbons to a plasma reactor inlet at the controlled H2/HC ratios.

The system of the preceding embodiment, wherein the operations include adjusting the H2/HC ratio based on a hydrogen purity, a feed flow rate, a recycle gas flow rate, or any combination thereof.

The system of the preceding embodiment, wherein the operations comprise determining a hydrogenation efficiency based on the H2/HC ratio.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. Moreover, the order in which the elements of the methods described herein are illustrated and described may be re-arranged, and/or two or more elements may occur simultaneously. The embodiments were chosen and described in order to best explain the principles of the disclosure and its practical applications, to thereby enable others skilled in the art to best utilize the disclosure and various embodiments with various modifications as are suited to the particular use contemplated.

Finally, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f). However, for any claims containing elements designated in any other manner, it is intended that such elements are not to be interpreted under 35 U.S.C. 112(f).

The invention claimed is:

1. A system, comprising:
   a plasma reactor configured to receive a feed gas flow at an inlet of the plasma reactor and to produce a mixture of saturated and unsaturated hydrocarbons and hydrogen;
   a catalyst bed disposed downstream of the plasma reactor, wherein the catalyst bed is configured to hydrogenate the unsaturated hydrocarbons from the plasma reactor and yield a product flow;
   a separator configured to receive the product flow from the catalyst bed and separate the product flow into liquid products, excess hydrogen for collection, and recycle gas, wherein the separator comprises a low-pressure vessel operable at or near pressure conditions of the plasma reactor; and
   a recycle system configured to direct the recycle gas to the inlet of the plasma reactor, the recycle system comprising a hydrogen to hydrocarbon (H2/HC) controller configured to:
      determine a H2/HC ratio of gas fed to the plasma reactor based on a number of moles of hydrogen in the recycle gas per mole of the feed gas flow; and
      control a flow of the recycle gas to the inlet of the plasma reactor to maintain the H2/HC ratio within a target range without external hydrogen being added to the recycle gas, wherein the target range of the H2/HC ratio is set to enhance both plasma conversion of the feed gas flow and hydrogenation efficiency of the unsaturated hydrocarbons and to provide process stability to the catalyst bed.

2. The system of claim 1, wherein the system is configured to control the hydrogenation of the unsaturated hydrocarbons by controlling a temperature of the catalyst bed, a space velocity of the catalyst bed, or both.

3. The system of claim 1, wherein the catalyst bed is in a lead/lag catalyst bed configuration comprising two or more catalyst beds arranged in series.

4. The system of claim 1, wherein the H2/HC controller is configured to control a composition of the recycle gas based on the H2/HC ratio.

5. The system of claim 1, wherein the system is configured to identify carbon laydown, solid precipitation, fouling, or a combination thereof based on a pressure differential in the catalyst bed being above a threshold value.

6. The system of claim 1, wherein the system is configured to control catalyst activity based on operating temperatures of the catalyst bed.

7. The system of claim 1, wherein the catalyst bed is configured to provide process stability while retaining plasma-induced activation.

8. The system of claim 1, wherein the recycle gas comprises hydrogen and unconverted hydrocarbons.

9. The system of claim 1, wherein the H2/HC controller is configured to adjust the H2/HC ratio based on a hydrogen purity, a feed flow rate, a recycle gas flow rate, or any combination thereof.

10. The system of claim 1, wherein the H2/HC controller is further configured to determine a hydrogenation efficiency based on the H2/HC ratio.

11. The system of claim 1, wherein:

the plasma reactor comprises a dielectric barrier discharge (DBD) plasma reactor having two electrodes separated by a dielectric barrier;

the catalyst bed comprises:

a lead/lag catalyst bed configuration having at least two catalyst beds arranged in series, with a first catalyst bed of the at least two catalyst beds acting as a working catalyst bed and a second catalyst bed of the at least two catalyst beds acting as a backup bed;

a guard bed located upstream from the first catalyst bed to filter particulates;

a hydrogenation catalyst comprising a metal, the hydrogenation catalyst operable at a temperature between 100° C. and 500° C.; and one or more sensors to monitor a pressure differential in the catalyst bed, a temperature of the catalyst bed, and a space velocity of the catalyst bed;

the hydrogen to hydrocarbon (H2/HC) controller is configured to control the hydrogenation of the unsaturated hydrocarbons by controlling the temperature of the catalyst bed and the space velocity of the catalyst bed;

the hydrogen to hydrocarbon (H2/HC) controller is configured to identify carbon laydown, solid precipitation, fouling, or a combination thereof based on the pressure differential in the catalyst bed being above a threshold value;

the separator comprises a knockout drum, and the target range of the H2/HC ratio is between 1/2 and 1/3.

12. A method of operating the system of claim 1, the method comprising:

introducing effluent from the plasma reactor to the catalyst bed, wherein the effluent comprises the mixture of saturated and unsaturated hydrocarbons and hydrogen;

hydrogenating the unsaturated hydrocarbons in the effluent via the catalyst bed using a hydrogenation catalyst to yield the product flow;

controlling a temperature of the catalyst bed to achieve the hydrogenation;

providing the product flow from the catalyst bed to the separator;

separating, via the separator, the product flow into the liquid products, the excess hydrogen for collection, and the recycle gas; and directing the recycle gas to the inlet of the plasma reactor, wherein the hydrogen to hydrocarbon (H2/HC) controller is configured to:

determine a H2/HC ratio of gas fed to the plasma reactor based on a number of moles of hydrogen in the recycle gas per mole of the feed gas flow; and control a flow of the recycle gas to the inlet of the plasma reactor to maintain the H2/HC ratio within a target range without external hydrogen being added to the recycle gas, wherein the target range of the H2/HC ratio is set to enhance both plasma conversion of the feed gas flow and hydrogenation efficiency of the unsaturated hydrocarbons and to provide process stability to the catalyst bed.

13. The method of claim 12, further comprising determining a space velocity based on a volumetric gas flow into the catalyst bed and a volume of the catalyst bed.

14. The method of claim 12, further comprising providing, via the catalyst bed, process stability while retaining plasma-induced activation.

15. The method of claim 12, further comprising controlling a reaction operating temperature to control catalyst activity.

* * * * *